United States Patent
Kani et al.

(10) Patent No.: US 12,479,134 B2
(45) Date of Patent: Nov. 25, 2025

(54) HEATING DEVICE AND HEATING METHOD

(71) Applicant: MITSUBISHI HEAVY INDUSTRIES, LTD., Tokyo (JP)

(72) Inventors: Yuki Kani, Tokyo (JP); Ryota Ozaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 137 days.

(21) Appl. No.: 17/792,593

(22) PCT Filed: Jun. 30, 2020

(86) PCT No.: PCT/JP2020/025665
§ 371 (c)(1),
(2) Date: Jul. 13, 2022

(87) PCT Pub. No.: WO2022/003825
PCT Pub. Date: Jan. 6, 2022

(65) Prior Publication Data
US 2023/0043404 A1 Feb. 9, 2023

(51) Int. Cl.
*B23K 20/00* (2006.01)
*B29C 35/02* (2006.01)
(Continued)

(52) U.S. Cl.
CPC ...... *B29C 35/0805* (2013.01); *B29C 35/0261* (2013.01); *B29C 70/42* (2013.01); *B29C 2035/0811* (2013.01); *B29K 2101/12* (2013.01)

(58) Field of Classification Search
CPC ... B29C 70/461; B29C 70/543; B29C 70/681; B23K 11/11; B23K 11/14; B23K 11/16; B23K 13/04; B23K 20/025
See application file for complete search history.

(56) References Cited

U.S. PATENT DOCUMENTS

| | | | | |
|---|---|---|---|---|
| 3,272,674 A | * | 9/1966 | Sachs | B29C 66/8322 156/583.3 |
| 3,717,539 A | * | 2/1973 | Roberts | B29C 66/91411 156/73.4 |

(Continued)

FOREIGN PATENT DOCUMENTS

| | | |
|---|---|---|
| JP | H07-171895 A | 7/1995 |
| JP | H07-205297 A | 8/1995 |

(Continued)

OTHER PUBLICATIONS

PCT/ISA/210, "International Search Report for PCT International Application No. PCT/JP2020/025665," Sep. 1, 2020.
(Continued)

*Primary Examiner* — Matthew J Daniels
(74) *Attorney, Agent, or Firm* — HAUPTMAN HAM, LLP

(57) ABSTRACT

Provided is a heating device including: a heating unit that heats a laminate which includes a plurality of sheet-like composite materials including reinforced fiber and thermoplastic resin, and heats, via a first contact surface disposed in contact with the laminate, the thermoplastic resin included in the laminate being in contact with the first contact surface to a softening temperature or higher; a cooling unit that cools, via a second contact surface disposed in contact with the laminate, the thermoplastic resin included in the laminate located outside of the second contact surface to a temperature lower than the softening temperature; and a pressing unit that applies a predetermined pressure to the laminate via the first contact surface and the second contact surface, the second contact surface being disposed so as to surround the first contact surface.

1 Claim, 7 Drawing Sheets

(51) Int. Cl.
*B29C 35/08* (2006.01)
*B29C 70/42* (2006.01)
*B29K 101/12* (2006.01)

(56) References Cited

U.S. PATENT DOCUMENTS

| | | | | |
|---|---|---|---|---|
| 4,267,223 | A | * | 5/1981 | Swartz .................... B32B 27/08 428/339 |
| 6,162,314 | A | * | 12/2000 | Kassuelke ............... B29C 70/46 156/266 |
| 2011/0139353 | A1 | | 6/2011 | Sugiyama et al. |
| 2017/0355149 | A1 | | 12/2017 | Wang et al. |
| 2018/0371849 | A1 | * | 12/2018 | Daton-Lovett ..... B29C 65/1658 |

FOREIGN PATENT DOCUMENTS

| | | |
|---|---|---|
| JP | H08-118473 A | 5/1996 |
| JP | 2002-011791 A | 1/2002 |
| JP | 2010-046831 A | 3/2010 |
| JP | 2020-049716 A | 4/2020 |

OTHER PUBLICATIONS

PCT/ISA/237, "Written Opinion for PCT International Application No. PCT/JP2020/025665," Sep. 1, 2020.

M. Duhovic et al. "Advanced 3D Finite Element Simulation of Thermoplastic Carbon Fiber Composite Induction Welding" 16th European Conference on Composite Materials, Seville, Spain, Jun. 22-26, 2014.

European Patent Office "Extended European Search Report with Search Opinion for European Patent Application No. 20942472.0," Apr. 26, 2023.

* cited by examiner

HEATING DEVICE AND HEATING METHOD

RELATED APPLICATIONS

The present application is National Phase of International Application No. PCT/JP2020/025665 filed Jun. 30, 2020, the disclosure of which is hereby incorporated by reference herein in its entirety.

TECHNICAL FIELD

The present disclosure relates to a heating device and a heating method for heating a laminate that includes a plurality of sheet-like composite materials that include reinforcing fibers and thermoplastic resin.

BACKGROUND ART

In the related art, there is known a technique of heating a plurality of composite materials that include carbon fibers and thermoplastic resin to melt the thermoplastic resin, thereby fusing the plurality of composite materials to each other (refer to, for example, NPL 1). NPL 1 discloses protecting the surface of the composite material close to an induction coil from damage due to heat by lowering the temperature of the surface of the composite material by injecting air into a space between the induction coil and the surface of the composite material.

CITATION LIST

Non-Patent Literature

[NPL 1] M. Duhovic et al. "ADVANCED 3D FINITE ELEMENT SIMULATION OF THERMOPLASTIC CARBON FIBER COMPOSITE INDUCTION WELDING" 16th EUROPEAN CONFERENCE ON COMPOSITE MATERIALS, Seville, Spain, 22-26 Jun. 2014

SUMMARY OF INVENTION

Technical Problem

In order to properly fuse a plurality of composite materials to each other, it is necessary to appropriately pressurize the composite materials in a state where the thermoplastic resin is heated. However, in NPL 1, since air flows through the space between the induction coil and the surface of the composite material, the composite material cannot be pressurized toward a fusion position at the position that is heated by the induction coil. In NPL 1, since the composite material is pressurized by a roller at a position to which the composite material is conveyed from the position where the composite material is heated by the induction coil, the temperature of the thermoplastic resin becomes lower than that at the position where the composite material is heated by the induction coil, so that there is a possibility that it may not be possible to obtain a preferable fused state.

Further, by bringing a heating device into contact with the composite material, it is possible to heat the composite material while pressurizing it. However, there is a possibility that the composite material in the portion that is not pressurized by the heating device may be heated by heat that is transferred from the heating device to the composite material. In this case, due to heating, deformation such as expansion occurs in the composite material at the portion that is not pressurized, so that there is a possibility that a molding defect may occur.

The present disclosure has been made in view of such circumstances, and has an object to provide a heating device and a heating method, in which when heating a laminate that includes a plurality of sheet-like composite materials that include reinforcing fibers and thermoplastic resin, it is possible to prevent deformation such as expansion from occurring due to a partial region of the laminate being heated in a state of not being pressurized.

Solution to Problem

According to an aspect of the present disclosure, there is provided a heating device that heats a laminate which includes a plurality of sheet-like composite materials that include reinforcing fibers and thermoplastic resin, the heating device including: a heating unit that heats, through a first contact surface that is in contact with the laminate, the thermoplastic resin included in the laminate that comes into contact with the first contact surface to a temperature equal to or higher than a softening temperature; a cooling unit that cools, through a second contact surface that is in contact with the laminate, the thermoplastic resin included in the laminate located outside the second contact surface to a temperature lower than the softening temperature; and a pressurizing unit that applies a predetermined pressurizing force to the laminate through the first contact surface and the second contact surface, in which the second contact surface is disposed to surround the first contact surface.

According to another aspect of the present disclosure, there is provided a heating method of heating a laminate which includes a plurality of sheet-like composite materials that include reinforcing fibers and thermoplastic resin, the heating method including: a heating step of heating, through a first contact surface that is in contact with the laminate, the thermoplastic resin included in the laminate that comes into contact with the first contact surface to a temperature equal to or higher than a softening temperature; a cooling step of cooling, through a second contact surface that is in contact with the laminate, the thermoplastic resin included in the laminate located outside the second contact surface to a temperature lower than the softening temperature; and a pressurizing step of applying a predetermined pressurizing force to the laminate through the first contact surface and the second contact surface, in which when the heating step is executed, the cooling step and the pressurizing step are executed at the same time, and the second contact surface is disposed to surround the first contact surface.

Advantageous Effects of Invention

According to the present disclosure, it is possible to provide a heating device and a heating method, in which when heating a laminate that includes a plurality of sheet-like composite materials that include reinforcing fibers and thermoplastic resin, it is possible to prevent deformation such as expansion from occurring due to a partial region of the laminate being heated in a state of not being pressurized.

DESCRIPTION OF EMBODIMENTS

Figure 1:
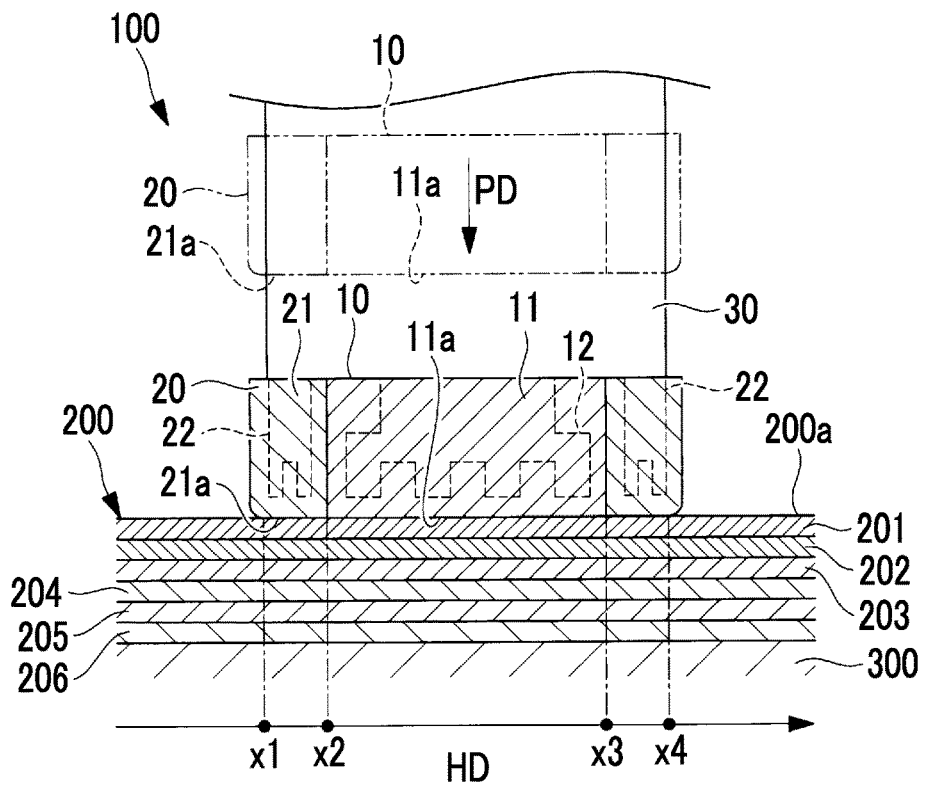
FIG. 1 is a sectional view showing a heating device according to an embodiment of the present disclosure.
Figure 2:
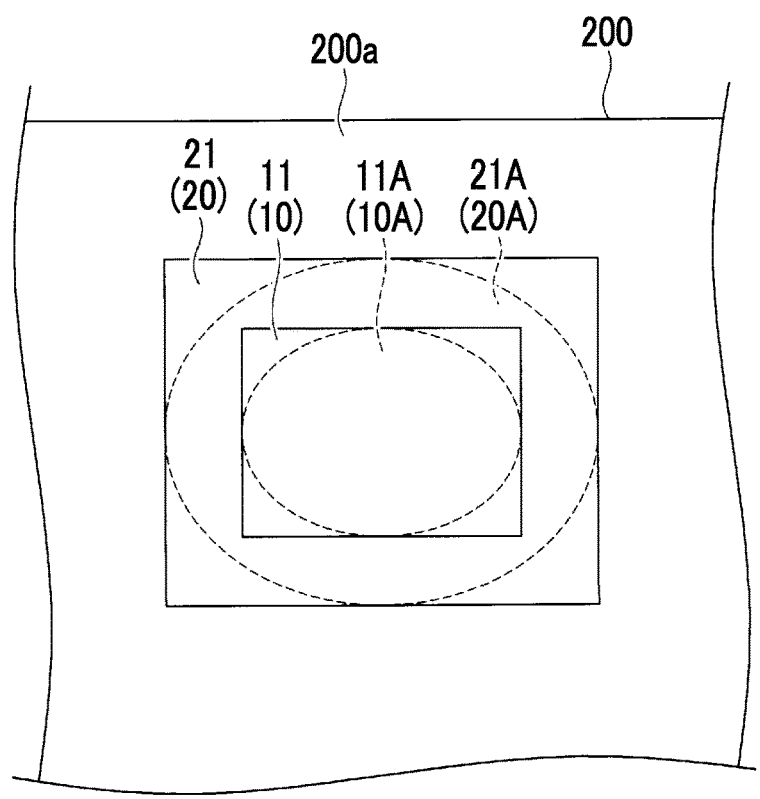
FIG. 2 is a plan view of the heating device shown in FIG. 1, as viewed from above.

Hereinafter, a heating device 100 according to an embodiment of the present disclosure and a heating method using the heating device 100 will be described with reference to the drawings. FIG. 1 is a sectional view showing the heating device 100 according to an embodiment of the present disclosure. FIG. 2 is a plan view of the heating device 100 shown in FIG. 1, as viewed from above.

The heating device 100 of the present embodiment is a device for closely adhering a plurality of sheet-like composite materials 201 to 206 that include reinforcing fibers and thermoplastic resin to each other by heating a laminate 200 that includes the plurality of composite materials 201 to 206. The heating device 100 heats the thermoplastic resin included in the composite material to a temperature equal to or higher than a softening temperature Ts by a heating mechanism 12 disposed inside.

Here, the softening temperature Ts is a temperature at which the thermoplastic resin can be deformed by applying an external force thereto, and in a case where the melting point of the thermoplastic resin included in the composite materials 201 to 206 is set as Tm, the softening temperature Ts is expressed by the following expression (1).

$$Ts=Tm-Tth \quad (1)$$

Tth is a temperature determined in advance according to the type of the thermoplastic resin and is, for example, 30° C.

As shown in FIG. 1, the laminate 200 is a laminate formed by laminating six layers of sheet-like composite materials 201, 202, 203, 204, 205, and 206. The laminate 200 has, for example, a flat shape. However, it may have any curved surface shape. Each of the composite materials 201 to 206 includes a fiber base material (for example, carbon fibers) and thermoplastic resin. The heating device 100 closely adheres the composite materials 201 to 206 to each other by heating the laminate 200 to a softening point or higher in a pressurized state.

The thermoplastic resin that is included in the composite materials 201 to 206 is, for example, polyetheretherketone (PEEK), polyethylene terephthalate (PET), polybutylene terephthalate (PBT), nylon 6 (PA6), nylon 66 (PA66), polyphenylene sulfide (PPS), polyetherimide (PEI), polyetherketoneketone (PEKK), or the like.

As shown in FIG. 1, the heating device 100 of the present embodiment includes a heating unit 10, a cooling unit 20, and a pressurizing unit 30.

The heating unit 10 has a heating housing 11 having a contact surface (a first contact surface) 11a that comes into contact with an upper surface 200a of the laminate 200, and the heating mechanism 12 that is disposed inside the heating housing 11. The heating unit 10 heats the thermoplastic resin included in the laminate 200 that comes into contact with the contact surface 11a to a temperature equal to or higher than the softening temperature Ts through the contact surface 11a that is in contact with the upper surface 200a of the laminate 200.

The heating housing 11 is a solid housing that has the contact surface 11a on the lower side thereof and is formed of a material (for example, an iron-based alloy, an aluminum-based alloy, or ceramics) having thermal conductivity capable of transferring the heat generated by the heating mechanism 12 to the contact surface 11a. The heating mechanism 12 has a heating source for heating the heating housing 11. The heating source is, for example, an electric heater that heats the heating housing 11 by causing an electric current to flow through a resistance wire disposed inside the heating housing 11 to generate heat in the resistance wire.

The cooling unit 20 has a cooling housing 21 having a contact surface (a second contact surface) 21a that comes into contact with the upper surface 200a of the laminate 200, and a cooling mechanism 22 that is disposed inside the cooling housing 21. The cooling unit 20 cools the thermoplastic resin included in the laminate 200 located outside the contact surface 21a to a temperature lower than the softening temperature Ts through the contact surface 21a that is in contact with the upper surface 200a of the laminate 200.

The cooling housing 21 is a solid housing that has the contact surface 21a on the lower side thereof and is formed of a material (for example, an iron-based alloy, an aluminum-based alloy, or ceramics) having thermal conductivity capable of transferring heat from the contact surface 21a to the cooling mechanism 22. The cooling mechanism 22 is a mechanism that performs heat exchange between the cooling housing 21 and a cooling medium by causing a heat exchange medium (for example, water) to flow through a cooling pipe disposed inside the cooling housing 21.

As shown in FIGS. 1 and 2, the heating housing 11 is formed in a rectangular shape when viewed in a plan view, and the cooling housing 21 is disposed so as to surround the entire circumference of the heating housing 11 in a state of being in contact with the heating housing 11. Similarly, the contact surface 21a of the cooling housing 21 is disposed so as to surround the entire circumference of the contact surface 11a of the heating housing 11. As shown in FIG. 2, the outer shape of the cooling housing 21 is rectangular.

In the example shown in FIG. 2, the heating housing 11 is formed in a rectangular shape when viewed in a plan view and the outer shape of the cooling housing 21 is rectangular. However, other aspects are also acceptable. For example, a heating unit 10A and a cooling unit 20A shown by a dotted line in FIG. 2 are also acceptable. A heating housing 11A of the heating unit 10A is formed in an elliptical shape, and the outer shape of a cooling housing 21A of the cooling unit 20A is formed in an elliptical shape. Further, the shape may be a perfect circle instead of the elliptical shape.

The pressurizing unit 30 is a mechanism for applying a predetermined pressurizing force to the laminate 200 through the contact surface 11a of the heating unit 10 and the contact surface 21a of the cooling unit 20. An installation die 300 is a die on which the laminate 200 is installed in order to closely adhere the plurality of composite materials 201 to 206 of the laminate 200 to each other by the heating device 100.

The pressurizing unit 30 applies a pressurizing force in a direction orthogonal to the upper surface 200a of the laminate 200 along a pressurizing direction PD. The pressurizing unit 30 can switch between a pressurized state (a state shown by a solid line in FIG. 1) where the contact surface 11a and the contact surface 21a pressurize the upper surface 200a of the laminate 200 and a non-pressurized state (a state shown by a dotted line in FIG. 1) where the contact surface 11a and the contact surface 21a are separated from the upper surface 200a of the laminate 200.

By performing heating by the heating unit 10 in a state of being pressurized by the pressurizing unit 30, it is possible to closely adhere the plurality of composite materials 201 to 206 of the laminate 200 to each other. Further, when the laminate 200 is cooled from a temperature equal to or higher than the softening temperature Ts to a temperature lower than the softening temperature Ts, by continuing the pressurization by the pressurizing unit 30, it is possible to maintain a state where the plurality of composite materials 201 to 206 are closely adhered to each other.

Figure 3:
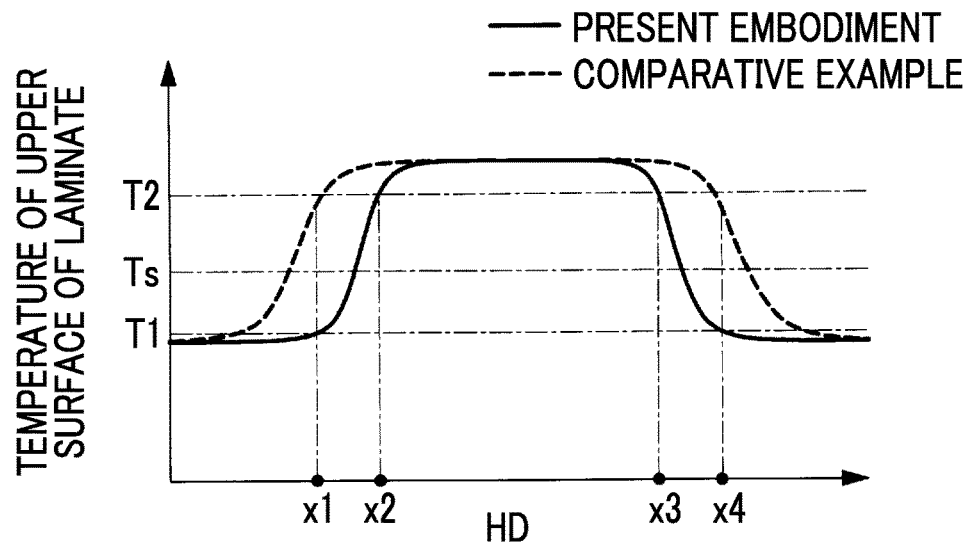
FIG. 3 is a graph showing a temperature at each position in a horizontal direction on the upper surface of a laminate shown in FIG. 1.

Next, a temperature distribution of the upper surface 200a of the laminate 200 in the pressurized state where the contact surface 11a and the contact surface 21a pressurize the upper surface 200a of the laminate 200 will be described. FIG. 3 is a graph showing the temperature at each position in a horizontal direction HD of the upper surface 200a of the laminate 200 shown in FIG. 1. As shown in FIG. 1, the horizontal direction HD is a direction along the direction in which the upper surface 200a of the laminate 200 is disposed.

A position x1 shown in FIG. 1 is a position where the contact between the contact surface 21a of the cooling housing 21 and the upper surface 200a of the laminate 200 is started in the horizontal direction HD. That is, the left side of the position x1 is a region with which the contact surface 21a does not come into contact. A position x2 is a position where switching from the contact surface 21a to the contact surface 11a in the horizontal direction HD is performed. A position x3 is a position where switching from the contact surface 11a to the contact surface 21a in the horizontal direction HD is performed. A position x4 is a position where the contact between the contact surface 21a of the cooling housing 21 and the upper surface 200a of the laminate 200 is ended in the horizontal direction HD. That is, the right side of the position x4 is a region with which the contact surface 21a does not come into contact.

The heating device 100 of the present embodiment adjusts the heating mechanism 12 of the heating unit 10 such that the region of the upper surface 200a of the laminate 200, which is in contact with the contact surface 11a, is heated to a temperature equal to or higher than a temperature T2 higher than the softening temperature Ts. As shown in FIG. 3, the region of the upper surface 200a of the laminate 200 (the region from the position x2 to the position x3), which is in contact with the contact surface 11a, is maintained at a temperature equal to or higher than the temperature T2.

On the other hand, the heating device 100 of the present embodiment adjusts the cooling mechanism 22 of the cooling unit 20 such that the region outside the region of the upper surface 200a of the laminate 200, which is in contact with the contact surface 11a, is cooled to a temperature equal to or lower than a temperature T1 lower than the softening temperature Ts. As shown in FIG. 3, the regions (the region on the left side of the position x1 and the region on the right side of the position x4) outside the contact surface 21a of the upper surface 200a of the laminate 200 are maintained at a temperature equal to or lower than the temperature T1.

In this manner, the heating device 100 of the present embodiment adjusts the amount of heat that is generated by the heating unit 10 and the amount of heat that is absorbed by the cooling mechanism 22 of the cooling unit 20, thereby maintaining the regions outside the contact surface 21a of the upper surface 200a of the laminate 200 at a temperature equal to or lower than the temperature T1. As shown in FIG. 3, a region having the softening temperature Ts appears in each of the regions (the region from the position x1 to the position x2 and the region from the position x3 to the position x4) of the laminate 200, which come into contact with the contact surface 21a of the cooling unit 20.

Here, a comparative example shown by a dashed-dotted line in FIG. 3 will be described. The comparative example shown in FIG. 3 shows a temperature at each position in the horizontal direction HD of the upper surface 200a of the laminate 200 in the case of a state where the cooling medium does not flow through the cooling mechanism 22 of the cooling unit 20. In the comparative example shown in FIG. 3, the cooling unit 20 does not have the ability to cool the upper surface 200a of the laminate 200.

In the comparative example shown in FIG. 3, a part of each of the regions (the region on the left side of the position x1 and the region on the right side of the position x4) outside the region of the upper surface 200a of the laminate 200, which comes into contact with the contact surface 21a, has a temperature higher than the softening temperature Ts. The region that is located outside the region of the upper surface 200a of the laminate 200, which comes into contact with the contact surface 21a, and has a temperature higher than the softening temperature Ts is a region that is not pressurized by the contact surface 21a. Therefore, there is a possibility that deformation such as expansion may occur in the upper surface 200a of the laminate 200 having a temperature higher than the softening temperature Ts.

Figure 4:
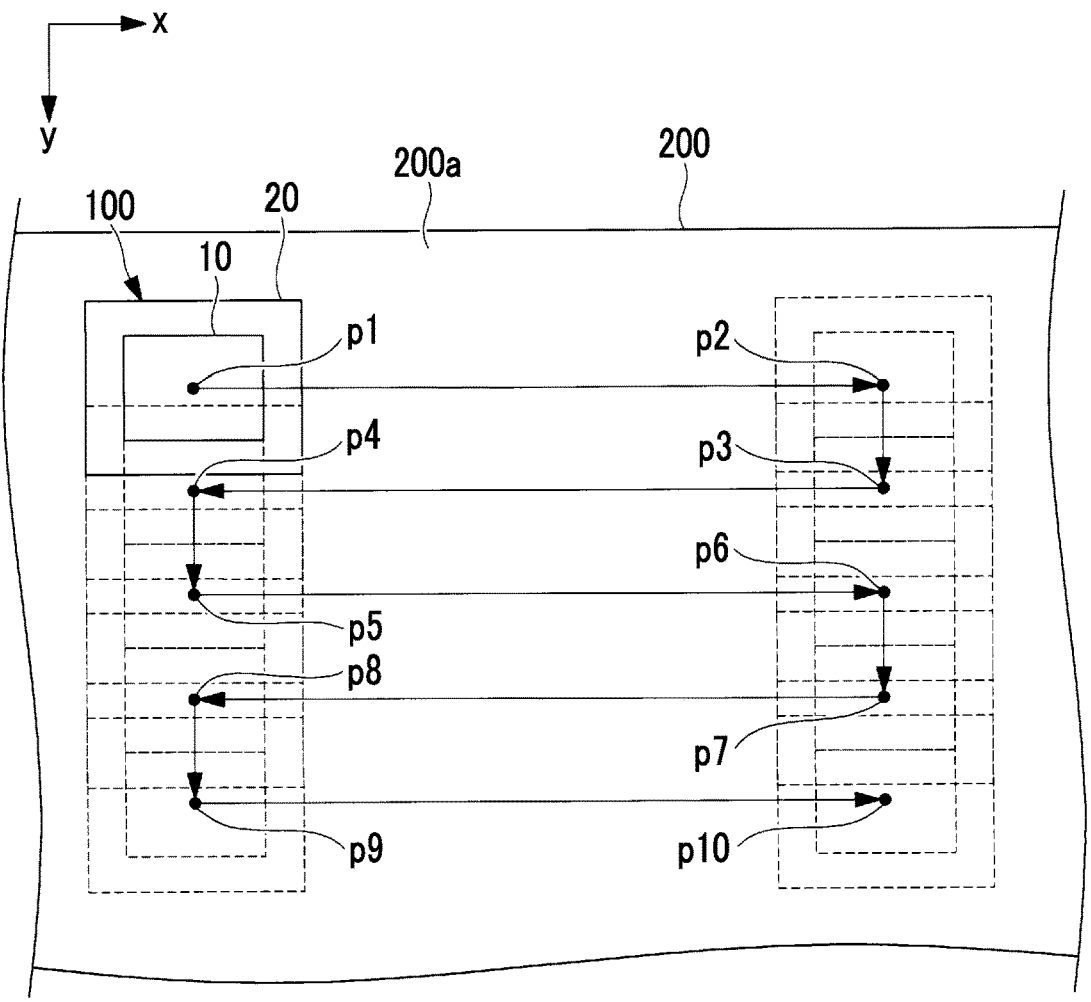
FIG. 4 is a plan view showing an example of a movement path when moving the heating device shown in FIG. 1 on the upper surface of the laminate.

Next, a moving method when moving the heating device 100 on the upper surface 200a of the laminate 200 will be described. FIG. 4 is a plan view showing an example of a movement path when moving the heating device shown in FIG. 1 on the upper surface of the laminate 200. In FIG. 4, the x-axis and the y-axis are axes orthogonal to each other and parallel to the upper surface 200a of the laminate 200.

As shown in FIG. 4, in the present embodiment, the heating device 100 is moved along a solid line in the order of a position p1, a position p2, a position p3, a position p4, a position p5, a position p6, a position p7, a position p8, a position p9, and a position p10 by using a moving mechanism (not shown). When moving the heating device 100 from the position p1 to the position p2, the moving mechanism moves the heating device 100 parallel to the x-axis. The same applies to the movement from the position p3 to the position p4, the movement from the position p5 to the position p6, the movement from the position p7 to the position p8, and the movement from the position p9 to the position p10.

When moving the heating device 100 from the position p2 to the position p3, the moving mechanism moves the heating device 100 parallel to the y-axis. The same applies to the movement from the position p4 to the position p5, the movement from the position p6 to the position p7, and the movement from the position p8 to the position p9. In this manner, in the example shown in FIG. 4, the heating device 100 is moved so as to heat each position of the laminate 200 while meandering by alternately repeating the movement along the x-axis and the movement along the y-axis orthogonal to the x-axis.

In the movement path shown in FIG. 4, the movement along the x-axis and the movement along the y-axis orthogonal to the x-axis are alternately repeated. However, other aspects are also acceptable. The movement path of the heating device 100 may be any movement path as long as each region of the laminate 200 can be heated by the contact surface 11a of the heating unit 10 for a predetermined time or longer.

Figure 5:
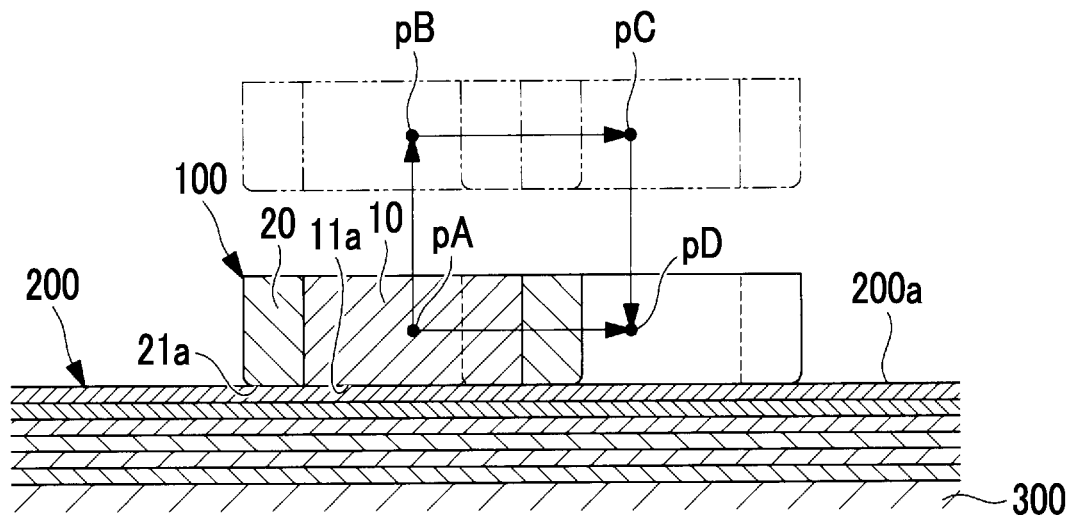
FIG. 5 is a sectional view showing an example of a moving direction when moving the heating device shown in FIG. 1 to an adjacent position on the upper surface of the laminate.

FIG. 5 is a sectional view showing an example of a moving direction when moving the heating device 100 shown in FIG. 1 to an adjacent position on the upper surface 200a of the laminate 200. A position pA indicates the central position where the current heating device 100 is disposed. A position pD indicates the central position of the heating device 100 when the heating device 100 has been moved from the current position to a position adjacent thereto.

When moving the heating device 100 from the position pA to the position pD, for example, the heating device 100 can be directly moved from the position pA to the position pD while maintaining a state where the contact surface 11a and the contact surface 21a are in contact with the upper surface 200a of the laminate 200. Further, for example, the heating device 100 may be moved to a position pB above the position pA such that the contact surface 11a and the contact surface 21a are separated from the upper surface 200a of the laminate 200. In this case, the moving mechanism (not shown) moves the heating device 100 from the position pB to a position pC above the position pD, and then moves the heating device 100 from the position pC to the position pD.

After the upper surface 200a of the laminate 200 is heated at the position pA by the heating device 100, before the heating device 100 is moved to the position pD adjacent thereto, the upper surface 200a of the laminate 200 is solidified by cooling the regions that are in contact with the contact surface 11a and the contact surface 21a while pressurizing the regions. For example, the upper surface 200a of the laminate 200 is cooled to a temperature lower than the softening temperature Ts by stopping the heating by the heating mechanism 12 of the heating device 100 while maintaining the application of the pressurizing force by the pressurizing unit 30.

Further, a cooling mechanism (not shown) is provided inside the heating unit 10, and when the upper surface 200a of the laminate 200, which is in contact with the contact surface 11a, is cooled by using the heating device 100, the contact surface 11a may be cooled by the cooling mechanism. Further, for example, the heating device 100 is removed and the upper surface 200a of the laminate 200 may be cooled while pressurizing it with another cooling die (not shown).

In a heating method using the heating device 100 of the present embodiment, a heating step of heating the upper surface 200a of the laminate 200, which is in contact with the contact surface 11a, by the heating unit 10, a cooling step of cooling the upper surface 200a of the laminate 200, which is in contact with the contact surface 21a, by the cooling unit 20, and a pressurizing step of applying a predetermined pressurizing force to the laminate 200 through the contact surface 11a and the contact surface 21a are simultaneously executed.

First Modification Example

Next, a first modification example of the heating device 100 shown in FIG. 1 will be described with reference to FIG. 6. A heating device 100A according to the present modification example is different from the heating device 100 shown in FIG. 1 in that a heating mechanism 12A has an induction coil that generates an electric current in the reinforcing fibers included in the laminate 200 to generate heat in the laminate 200.

Figure 6:
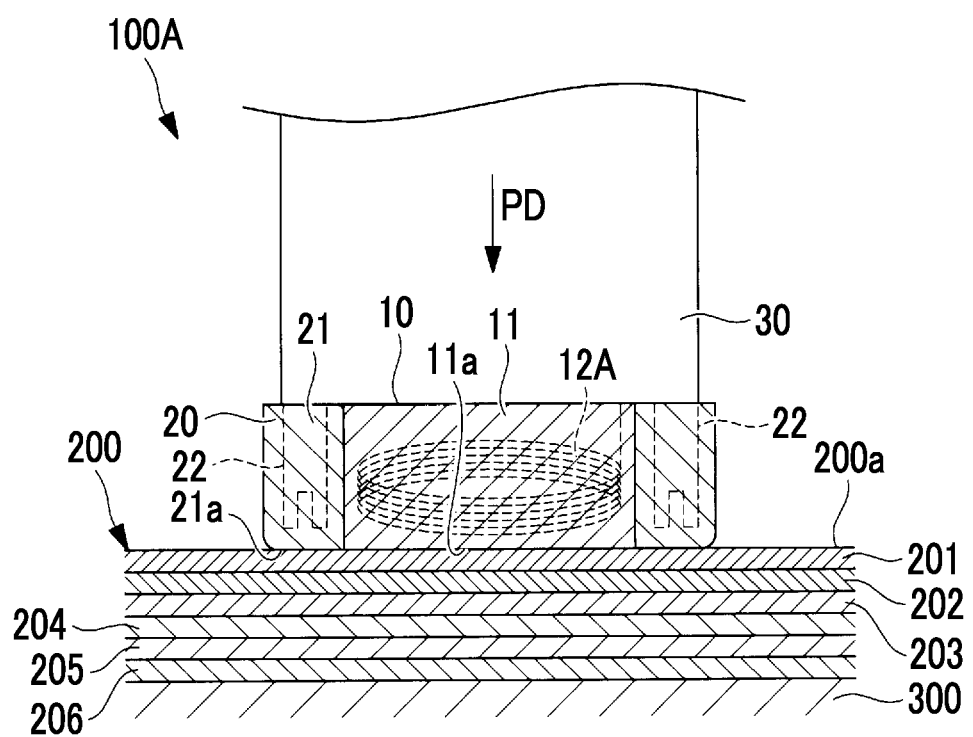
FIG. 6 is a sectional view showing a first modification example of the heating device shown in FIG. 1.

The heating mechanism 12A shown in FIG. 6 has an induction coil that generates a magnetic field line in the surroundings by an alternating current having a predetermined frequency, which is supplied from an alternating-current source (not shown), to generate an electric current in the reinforcing fibers having electric conductivity, which are disposed at a position adjacent thereto. The composite materials 201 to 206 included in the laminate 200 shown in FIG. 6 have reinforcing fibers (for example, carbon fibers) having electric conductivity.

The induction coil heats the laminate 200 to heat the thermoplastic resin included in the composite materials 201 to 206 to a temperature equal to or higher than the softening temperature Ts. Since the composite materials 201 to 206 are in contact with each other and are disposed in a pressurized state, when the thermoplastic resin included therein is heated to a temperature equal to or higher than the softening temperature Ts, the softened thermoplastic resin is integrated and the composite materials 201 to 206 are closely adhered to each other.

Second Modification Example

Next, a second modification example of the heating device 100 shown in FIG. 1 will be described with reference to FIG. 7. A heating device 100B according to the present modification example is different from the heating device 100 shown in FIG. 1 in that a heating mechanism 12B has an ultrasonic vibrator that generates vibration in the heating housing 11 to generate heat in the laminate 200.

The ultrasonic vibrator vibrates the laminate 200 by ultrasonic waves to generate heat in the thermoplastic resin included in the composite materials 201 to 206 to a temperature equal to or higher than the softening temperature Ts. Since the composite materials 201 to 206 are in contact with each other and are disposed in a pressurized state, when the thermoplastic resin included therein is heated to a temperature equal to or higher than the softening temperature Ts, the softened thermoplastic resin is integrated and the composite materials 201 to 206 are closely adhered to each other.

Third Modification Example

Figure 8:
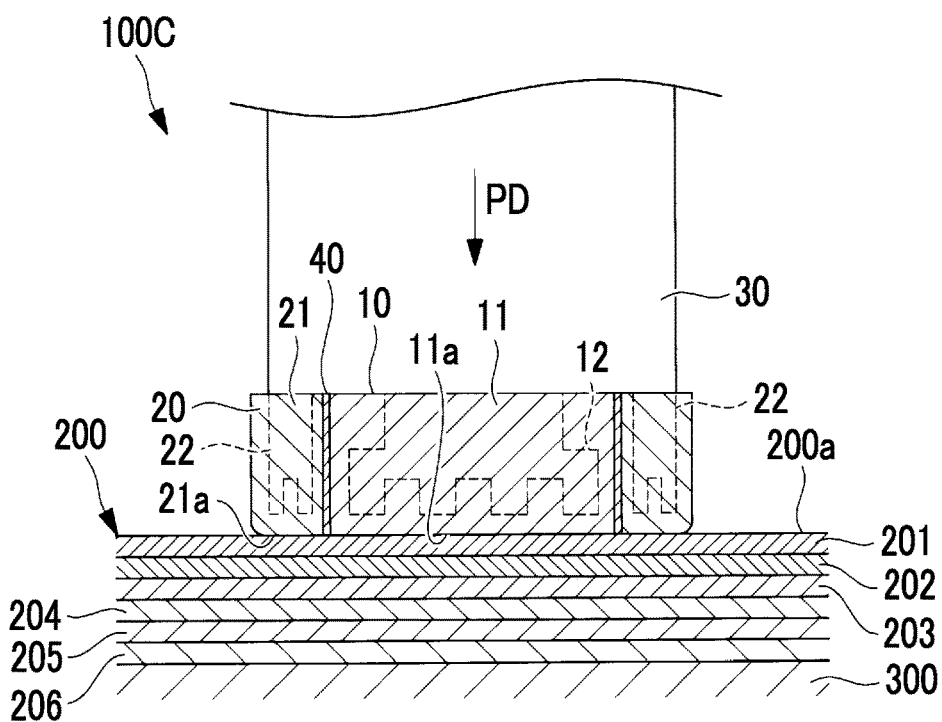
FIG. 8 is a sectional view showing a third modification example of the heating device shown in FIG. 1.

Next, a third modification example of the heating device 100 shown in FIG. 1 will be described with reference to FIG. 8. A heating device 100C according to the present modification example is different from the heating device 100 shown in FIG. 1 in that the cooling housing 21 is disposed so as to surround the heating housing 11 with a heat insulating material 40 interposed therebetween.

The heat insulating material 40 is a member that reduces the amount of heat that is heat-exchanged between the cooling housing 21 and the heating housing 11. By disposing the heat insulating material between the cooling housing 21 and the heating housing 11, it is possible to lower, for example, the cooling capacity of the cooling mechanism 22 required to obtain desired cooling performance, and downsize the cooling unit 20.

Fourth Modification Example

Next, a fourth modification example of the heating device 100 shown in FIG. 1 will be described with reference to FIG. 9. A heating device 100D according to the present modification example is different from the heating device 100 shown in FIG. 1 in that the heating device 100D has a cooling mechanism 22D that injects a cooling gas to the outside of the cooling housing 21 to cool the cooling housing 21.

The cooling mechanism 22D is a mechanism that injects a cooling gas CG toward the cooling housing 21 to cool the cooling housing 21. The cooling gas CG is, for example, air having room temperature. The cooling gas CG injected by the cooling mechanism 22D cools the cooling housing 21 and the upper surface 200a of the laminate 200 adjacent to the cooling housing 21.

Figure 7:
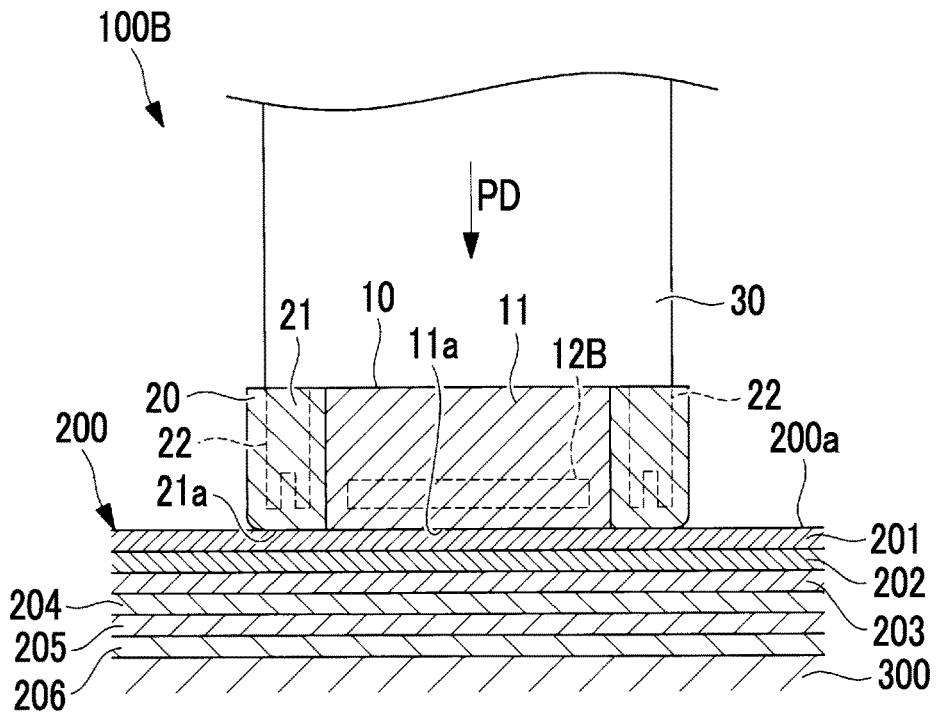
FIG. 7 is a sectional view showing a second modification example of the heating device shown in FIG. 1.
Figure 9:
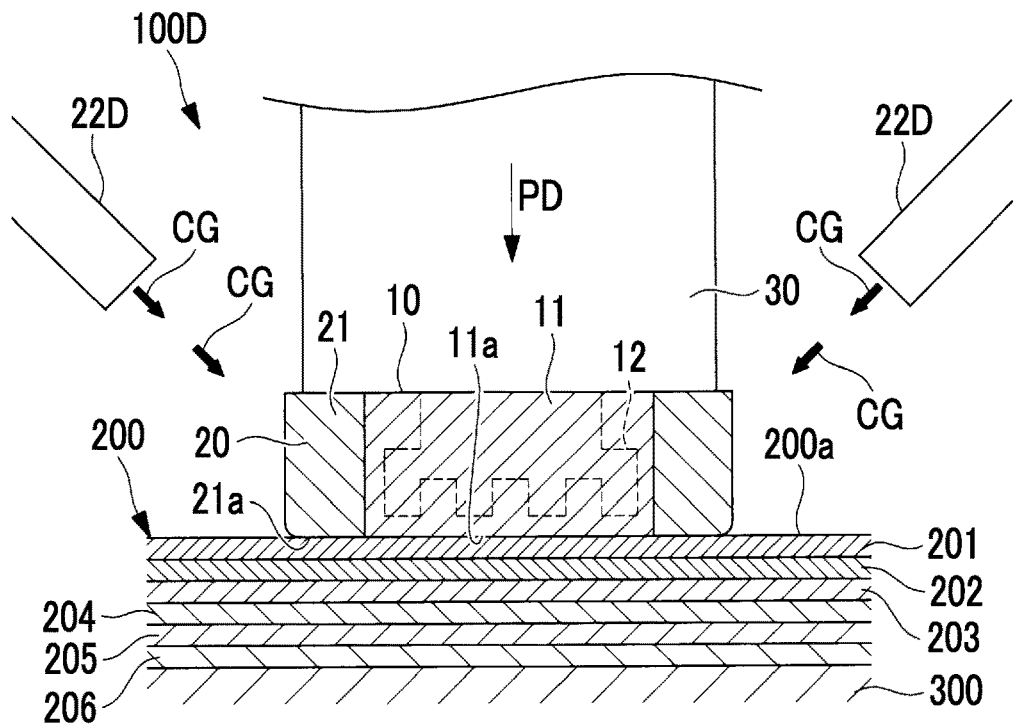
FIG. 9 is a sectional view showing a fourth modification example of the heating device shown in FIG. 1.

In the heating device 100 shown in FIG. 1, the heating device 100A shown in FIG. 6, the heating device 100B shown in FIG. 7, and the heating device 100D shown in FIG. 9, the heating housing 11 and the cooling housing 21 are separate housings separated from each other. However, other aspects are also acceptable. For example, the heating housing 11 and the cooling housing 21 may be integrally formed of a single material (for example, an iron-based alloy, an aluminum-based alloy, or ceramics).

Fifth Modification Example

Next, a fifth modification example of the heating device 100 shown in FIG. 1 will be described with reference to FIG. 10. A heating device 100E according to the present modification example is different from the heating device 100 shown in FIG. 1 in that a heating mechanism 12E included in the heating unit 10 can switch between a contact state where it is in contact with the heating housing 11 and a non-contact state where it is separated from the heating housing 11.

Figure 10:
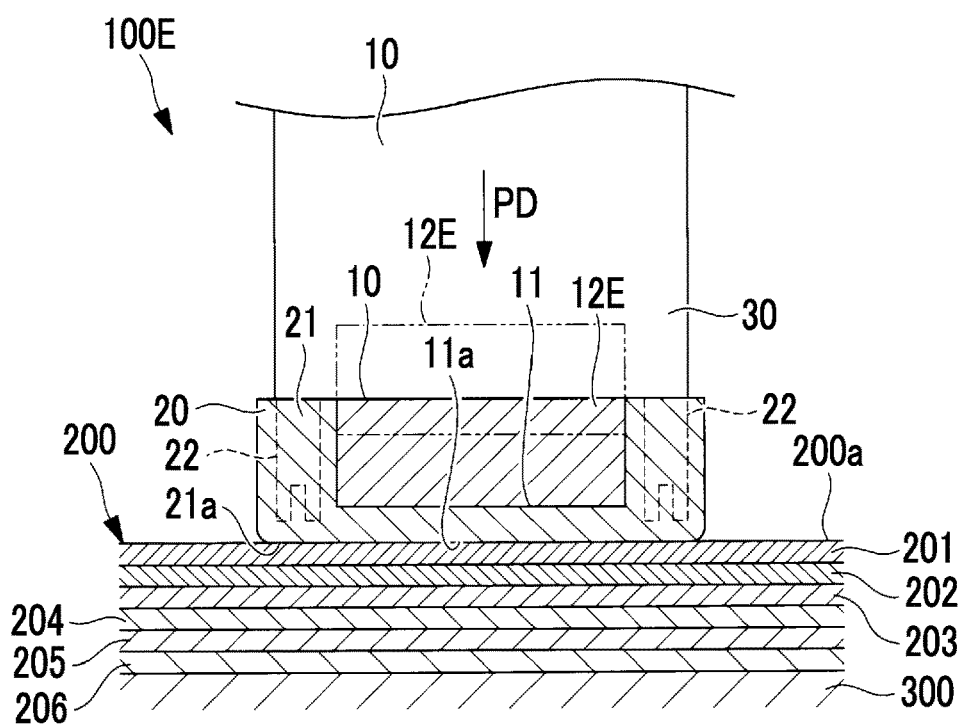
FIG. 10 is a sectional view showing a fifth modification example of the heating device shown in FIG. 1.

As shown in FIG. 10, the heating mechanism 12E is a mechanism that is disposed in contact with the heating housing 11 having the contact surface 11a. The heating housing 11 and the cooling housing 21 are integrally formed of a single material. The heating mechanism 12E can switch between a contact state where it is in contact with the heating housing 11 (a state shown by a solid line in FIG. 10) and a non-contact state where it is separated from the heating housing 11 (a state shown by a dotted line in FIG. 10). A heating source (not shown) for heating the heating housing 11 in a state of being in contact with the heating housing 11 is disposed inside the heating mechanism 12E.

When the upper surface 200a of the laminate 200 is heated, the heating device 100E is made to be in the contact state where the heating mechanism 12E is in contact with the heating housing 11, and heats the heating housing 11 by the heating mechanism 12E. On the other hand, when the upper surface 200a of the laminate 200 is cooled, the heating device 100E is made to be in the non-contact state where the heating mechanism 12E is separated from the heating housing 11 while the contact surface 11a of the heating housing 11 is in contact with the upper surface 200a of the laminate 200. By separating the heating mechanism 12E from the heating housing 11, the amount of heat that is transferred from the heating mechanism 12E to the heating housing 11 is reduced, and the cooling of the upper surface 200a of the laminate 200 is promoted.

Combinations of First to Fifth Modification Examples

Although the first to fifth modification examples of the heating device 100 shown in FIG. 1 have been described above, a plurality of modification examples included in the first to fifth modification examples may be combined with respect to the heating device 100 shown in FIG. 1. For example, the third modification example may be applied to the heating device 100A of the first modification example or the heating device 100B of the second modification example, so that the cooling housing 21 may be disposed to surround the heating housing 11 with the heat insulating material 40 interposed therebetween.

Further, for example, the fourth modification example may be applied to the heating device 100A of the first modification example, the heating device 100B of the second modification example, the heating device 100C of the third modification example, or the heating device 100E of the fifth modification example, so that the cooling mechanism 22D that injects a cooling gas to cool the cooling housing 21 may be provided outside the cooling housing 21.

Other Modification Examples

Figure 11:
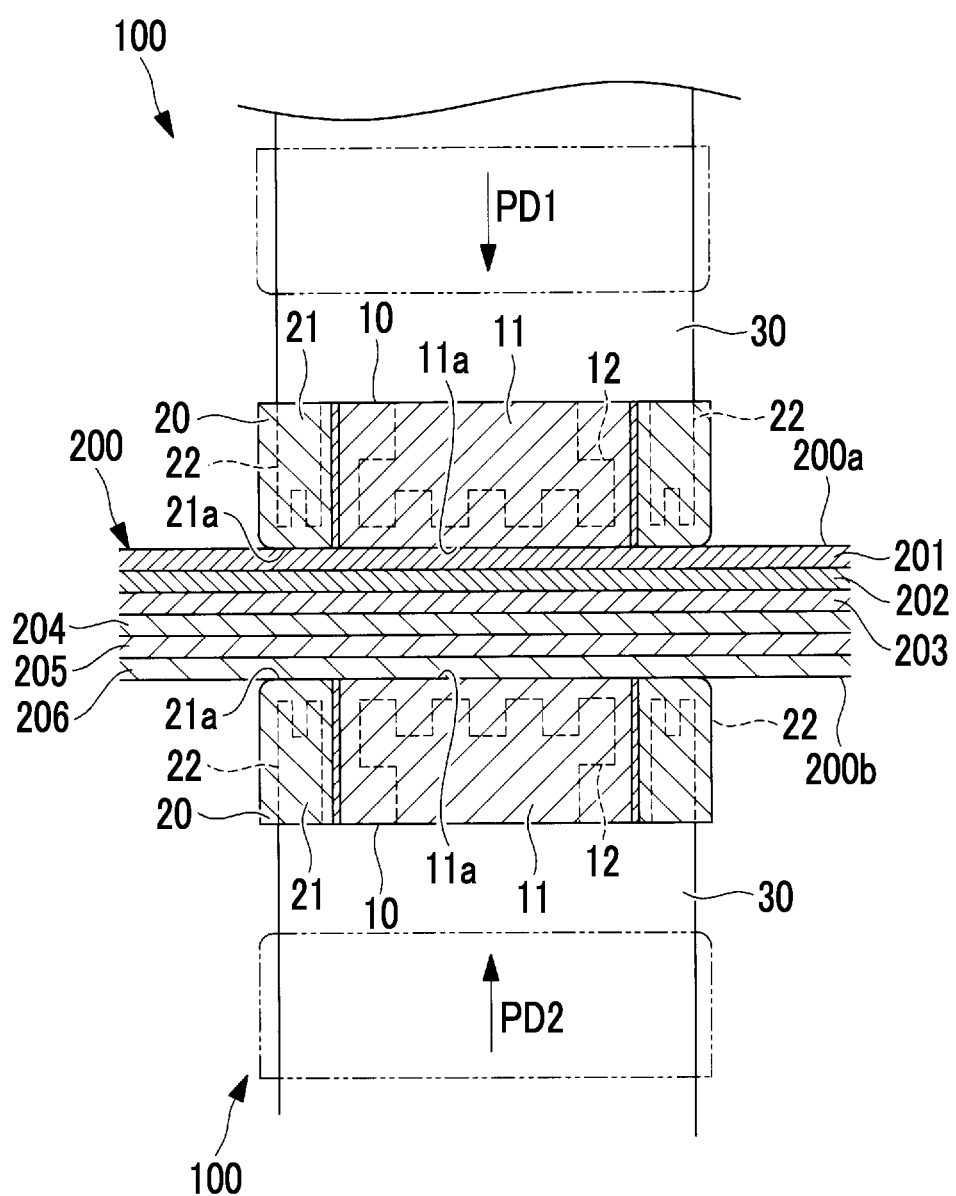
FIG. 11 is a diagram showing an example of heating and pressurizing the upper surface and the lower surface of the laminate by a pair of heating devices.

In the above description, when closely adhering the laminate 200, the laminate 200 is installed on the installation die 300, and the upper surface 200a of the laminate 200 is heated and pressurized by the heating device 100. However, other aspects are also acceptable. For example, as shown in FIG. 11, the upper surface 200a and a lower surface 200b of the laminate 200 may be heated and pressurized by a pair of heating devices 100. FIG. 11 is a diagram showing an example of heating and pressurizing the upper surface 200a and the lower surface 200b of the laminate 200 by the pair of heating devices 100.

In FIG. 11, the upper surface 200a of the laminate 200 is heated by the heating device 100 on one side, and the lower surface 200b of the laminate 200 is heated by the heating device 100 on the other side. The heating device 100 on one side pressurizes the upper surface 200a of the laminate 200 along a pressurizing direction PD1 facing downward, and the heating device 100 on the other side pressurizes the lower surface 200b of the laminate 200 along a pressurizing direction PD2 facing upward. In this way, the upper surface 200a and the lower surface 200b of the laminate 200 can be heated and pressurized at the same time, and the plurality of composite materials 201 to 206 can be closely adhered to each other.

Figure 12:
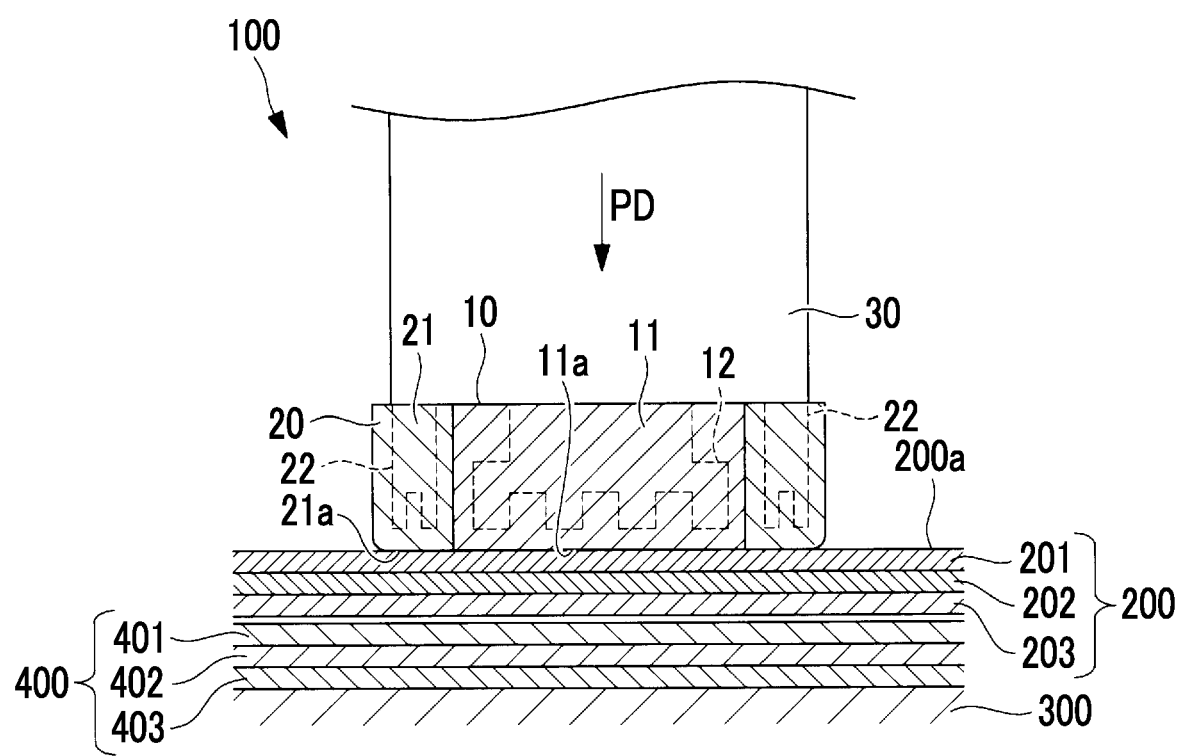
FIG. 12 is a sectional view showing an example in which a plurality of laminates are fused to each other by the heating device.

In the above description, the heating device 100 heats and pressurizes the laminate 200 in which a plurality of composite materials 201 to 206 that are not closely adhered to each other are laminated. However, other aspects are also acceptable. For example, as shown in FIG. 12, the laminate 200 and a laminate 400 may be fused to each other by the heating device 100. FIG. 12 is a sectional view showing an example in which a plurality of laminates 200 and 400 are fused to each other by the heating device 100.

The laminate 200 shown in FIG. 12 has the composite materials 201, 202, and 203 closely adhered to each other in advance. Further, the laminate 400 has composite materials 401, 402, and 403 closely adhered to each other in advance. In the example shown in FIG. 12, the laminate 200 having the composite materials 201, 202, and 203 closely adhered to each other in advance and the laminate 400 having the composite materials 401, 402, and 403 closely adhered to each other in advance are disposed in a state of being in contact with each other. The heating device 100 heats the upper surface 200a of the laminate 200, thereby heating the thermoplastic resin in the vicinity of the surface where the laminate 200 and the laminate 400 are in contact with each other to a temperature equal to or higher than the softening temperature Ts to fuse the laminate 200 and the laminate 400 to each other.

In the example shown in FIG. 12, the heating mechanism 12 of the heating device 100 may be the heating mechanism 12A having the induction coil shown in FIG. 6. In this case, it is preferable to dispose a heat generating aid (a susceptor) that promotes electromagnetic induction heating between the laminate 200 and the laminate 400. By generating an induced current in the heat generating aid disposed between the laminate 200 and the laminate 400, it is possible to promote the heating of the contact portion between the laminate 200 and the laminate 400.

The heating device described in the embodiment described above is grasped as follows, for example.

A heating device (100) according to the present disclosure heats a laminate (200) which includes a plurality of sheet-like composite materials (201 to 206) that include reinforcing fibers and thermoplastic resin, and includes a heating unit (10) that heats, through a first contact surface that is in contact with the laminate, the thermoplastic resin included in the laminate that comes into contact with the first contact surface (11a) to a temperature equal to or higher than a softening temperature (Ts), a cooling unit (20) that cools, through a second contact surface that is in contact with the laminate, the thermoplastic resin included in the laminate located outside the second contact surface (21a) to a temperature lower than the softening temperature, and a pressurizing unit (30) that applies a predetermined pressurizing force to the laminate through the first contact surface and the second contact surface, in which the second contact surface is disposed to surround the first contact surface.

According to the heating device according to the present disclosure, the heating unit heats the thermoplastic resin material included in the laminate to a temperature equal to or higher than the softening temperature through the first contact surface, and a predetermined pressurizing force is applied to the laminate through the first contact surface. Since the region of the laminate, which is in contact with the first contact surface, is heated in a pressurized state, the occurrence of deformation such as expansion is prevented.

Further, according to the heating device according to the present disclosure, although the region of the laminate, which is in contact with the second contact surface, is heated by heat that is transferred from the laminate heated through the first contact surface, a predetermined pressurizing force is applied thereto through the second contact surface. Therefore, deformation such as expansion is prevented from occurring in the region of the laminate, which is in contact with the second contact surface.

Further, according to the heating device according to the present disclosure, the cooling unit cools the thermoplastic resin material included in the laminate located outside the second contact surface to a temperature lower than the softening temperature. Therefore, the region of the laminate, which is disposed further outside the second contact surface, is prevented from being heated to a temperature equal to or higher than the softening temperature due to the heat transferred to the region of the laminate, which is in contact with the second contact surface. In this way, it is possible to prevent deformation such as expansion from occurring in a partial region of the laminate due to being heated in a state of not being pressurized.

In the heating device according to the present disclosure, a configuration is preferable in which the heating unit has a heating housing (11) having the first contact surface and a heating mechanism (12) that is disposed inside the heating housing, the cooling unit has a cooling housing (21) having the second contact surface and a cooling mechanism (22) that cools the cooling housing, and the cooling housing is disposed to surround the heating housing with a heat insulating material (40) interposed therebetween.

According to the heating device according to this configuration, the cooling housing that is cooled by the cooling mechanism is disposed so as to surround the heating housing that is heated by the heating mechanism with the heat insulating material interposed therebetween. Therefore, the amount of heat that is heat-exchanged between the cooling housing and the heating housing is reduced compared to a case where the heat insulating material is not provided. In this way, for example, the cooling capacity of the cooling mechanism required to obtain the desired cooling performance can be reduced, and the cooling unit can be downsized.

In the heating device according to the present disclosure, a configuration is preferable in which the heating unit has a heating housing (11) having the first contact surface and a heating mechanism (12) that is disposed inside the heating housing, the cooling unit has a cooling housing (21) having the second contact surface and a cooling mechanism (22) that cools the cooling housing, and the heating housing and the cooling housing are integrally formed of a single material.

According to the heating device according to this configuration, since the heating housing and the cooling housing are integrally formed of a single material, a problem such as intrusion of thermoplastic resin between the heating housing and the cooling housing does not occur compared to a case where the heating housing and the cooling housing are separate bodies.

In the heating device according to the above configuration, a configuration is preferable in which the heating unit has a heating housing (11) having the first contact surface and a heating mechanism (12E) that is disposed in contact with the heating housing, the cooling unit has a cooling housing (21) having the second contact surface and a cooling mechanism (22) that cools the cooling housing, the heating housing and the cooling housing are integrally formed of a single material, and the heating mechanism is capable of switching between a contact state where it is in contact with the heating housing and a non-contact state where it is separated from the heating housing.

According to the heating device according to this configuration, since the heating housing and the cooling housing are integrally formed of a single material, a problem such as intrusion of thermoplastic resin between the heating housing and the cooling housing does not occur compared to a case where the heating housing and the cooling housing are separate bodies. Further, by switching the heating mechanism to the non-contact state where it is separated from the heating housing, a cooling rate when performing cooling while pressurizing the laminate after stopping of the heating by the heating mechanism is improved.

In the heating device according to the above configuration, a configuration is preferable in which the heating mechanism has a heating source that heats the heating housing.

According to the heating device according to this configuration, by heating the heating housing through the heating source, it is possible to heat the thermoplastic resin included in the composite material which is in contact with the first contact surface to a temperature equal to or higher than the softening temperature.

In the heating device according to the above configuration, a configuration is preferable in which the heating mechanism has an ultrasonic vibrator that generates vibration in the heating housing to generate heat in the laminate.

According to the heating device according to this configuration, by generating heat in the laminate by generating vibration in the heating housing by the ultrasonic vibrator, it is possible to heat the thermoplastic resin included in the laminate which is in contact with the first contact surface to a temperature equal to or higher than the softening temperature.

In the heating device according to the above configuration, a configuration is preferable in which the heating mechanism has an induction coil that generates an electric current in the reinforcing fibers included in the laminate to generate heat in the laminate.

According to the heating device according to this configuration, by generating heat in the laminate by generating an electric current in the reinforcing fibers included in the laminate by the induction coil, it is possible to heat the thermoplastic resin included in the laminate which is in contact with the first contact surface to a temperature equal to or higher than the softening temperature.

In the heating device according to the above configuration, a configuration is preferable in which the cooling mechanism injects a cooling gas to cool the cooling housing (21).

According to the heating device according to this configuration, by injecting a cooling gas to cool the cooling housing, it is possible to cool the second contact surface disposed in a state of being in contact with the laminate to a temperature lower than the softening temperature.

The heating method described in the embodiment described above is grasped as follows, for example.

A heating method according to the present disclosure is a heating method of heating a laminate (200) which includes a plurality of sheet-like composite materials (201 to 206) that include reinforcing fibers and thermoplastic resin, the heating method including: a heating step of heating, through a first contact surface that is in contact with the laminate, the thermoplastic resin included in the laminate that comes into contact with the first contact surface (11a) to a temperature equal to or higher than a softening temperature (Ts); a cooling step of cooling, through a second contact surface that is in contact with the laminate, the thermoplastic resin included in the laminate located outside the second contact surface (21a) to a temperature lower than the softening temperature; and a pressurizing step of applying a predetermined pressurizing force to the laminate through the first contact surface and the second contact surface, in which when the heating step is executed, the cooling step and the pressurizing step are executed at the same time, and the second contact surface is disposed to surround the first contact surface.

According to the heating method according to the present disclosure, in the heating step, the thermoplastic resin material included in the laminate is heated to a temperature equal to or higher than the softening temperature through the first contact surface, and in the pressurizing step which is executed at the same time as the heating step, a predetermined pressurizing force is applied to the laminate through the first contact surface. Since the region of the laminate, which is in contact with the first contact surface, is heated in a pressurized state, the occurrence of deformation such as expansion is prevented.

Further, according to the heating method according to the present disclosure, in the heating step, the region of the laminate, which is in contact with the second contact surface, is heated by heat that is transferred from the laminate heated through the first contact surface. However, in the pressurizing step, a predetermined pressurizing force is applied to the region through the second contact surface. Therefore, deformation such as expansion is prevented from occurring in the region of the laminate, which is in contact with the second contact surface.

Further, according to the heating method according to the present disclosure, in the cooling step which is executed at the same time as the heating step, the thermoplastic resin material included in the laminate located outside the second contact surface is cooled to a temperature lower than the softening temperature. Therefore, the region of the laminate, which is disposed further outside the second contact surface, is prevented from being heated to a temperature equal to or higher than the softening temperature due to the heat transferred to the region of the laminate, which is in contact with the second contact surface. In this way, it is possible to prevent deformation such as expansion from occurring in a partial region of the laminate due to being heated in a state of not being pressurized.

REFERENCE SIGNS LIST 10, 10A Heating unit
11, 11A Heating housing
11a Contact surface (First contact surface)
12, 12A, 12B, 12E Heating mechanism
20, 20A Cooling unit
21, 21A Cooling housing
21a Contact surface (Second contact surface)
22, 22D Cooling mechanism
30 Pressurizing unit
40 Heat insulating material
100, 100A, 100B, 100C, 100D, 100E Heating device
200, 400 Laminate
200a Upper surface
200b Lower surface
201, 202, 203, 204, 205, 206, 401, 402, 403 Composite material
300 Installation die
400 Laminate
CG Cooling gas
HD Horizontal direction
PD, PD1, PD2 Pressurizing direction
Ts Softening temperature

The invention claimed is:

1. A heating method of heating a laminate which includes a plurality of composite materials that include reinforcing fibers and thermoplastic resin by using a heating device including a heating unit having a first contact surface and a cooling unit having a second contact surface which is disposed to surround the first contact surface, the heating method comprising:
- a heating step of heating, through the first contact surface that is in contact with the laminate, the thermoplastic resin included in the laminate that comes into contact with the first contact surface to a temperature equal to or higher than a softening temperature;
- a cooling step of cooling, through the second contact surface that is in contact with the laminate, the thermoplastic resin included in the laminate located outside the second contact surface to a temperature lower than the softening temperature;
- a pressurizing step of applying a predetermined pressurizing force to the laminate through the first contact surface and the second contact surface, and
- a moving step of moving the heating device relative to the laminate from a first position on the laminate to a second position on the laminate while maintaining a state where the first contact surface and the second contact surface are in contact with the laminate, wherein when the heating step is executed, the cooling step and the pressurizing step are executed at the same time, and the second contact surface is disposed to surround the first contact surface; and a step of cooling the thermoplastic resin included in the laminate that comes into contact with the first contact surface to a temperature lower than the softening temperature by stopping the heating through the first contact surface by the heating step while maintaining the application of the pressurizing force by the pressurizing step before the heating device is moved from the first position to the second position in the moving step.

* * * * *